United States Patent
Yoo (10) Patent No.: US 8,477,265 B2
(45) Date of Patent: Jul. 2, 2013

(54) BACKLIGHT UNIT AND DISPLAY APPARATUS HAVING THE SAME

(75) Inventor: Jun-mo Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 569 days.

(21) Appl. No.: 12/770,429

(22) Filed: Apr. 29, 2010

(65) Prior Publication Data

US 2011/0095970 A1 Apr. 28, 2011

(30) Foreign Application Priority Data

Oct. 27, 2009 (KR) .................. 10-2009-0102124

(51) Int. Cl.
*G02F 1/1335* (2006.01)
(52) U.S. Cl.
USPC .................. 349/67; 349/62; 349/63; 349/64; 349/65; 349/66
(58) Field of Classification Search
USPC ....................................... 349/62–67
See application file for complete search history.

(56) References Cited

U.S. PATENT DOCUMENTS

| 7,344,291 B2 * | 3/2008 | Hatanaka et al. ............. 362/610 |
| 2006/0203146 A1 | 9/2006 | Bang |
| 2009/0316064 A1 * | 12/2009 | Kono et al. ..................... 349/58 |

FOREIGN PATENT DOCUMENTS

| KR | 10-2006-0095391 A | 8/2006 |
| KR | 10-2007-0064752 A | 6/2007 |

* cited by examiner

*Primary Examiner* — Phu Vu
(74) *Attorney, Agent, or Firm* — Sughrue Mion, PLLC (57) ABSTRACT

A display apparatus and a backlight unit are provided. The display apparatus includes: an image receiving unit which receives an image signal; an image processing unit which processes the received image signal; a display panel which displays the processed image signal; a cover unit which accommodates the display panel; a light source unit which is accommodated in an edge region of the cover unit; a reflective member which is accommodated in the cover unit in such a manner that the reflective member is disposed in the rear side of the display panel and which reflects the light emitted from the light source unit toward the display panel; and an integrally formed support member including a support member body which is disposed in the edge region, a light source unit support unit which is formed in the support member body and supports the light source unit, and a panel support unit which is formed in the support member body and supports the display panel.

18 Claims, 6 Drawing Sheets

BACKLIGHT UNIT AND DISPLAY APPARATUS HAVING THE SAME

CROSS-REFERENCE TO RELATED APPLICATIONS

This application claims priority from Korean Patent Application No. 10-2009-0102124, filed on Oct. 27, 2009 in the Korean Intellectual Property Office, the disclosure of which is incorporated herein by reference.

BACKGROUND

1. Field

Methods and apparatuses consistent with the exemplary embodiments relate to a backlight unit which provides light to a display panel so that an image is displayed on the display panel, and a display apparatus having the same, and more particularly, to a backlight unit with an improved support structure, and a display apparatus having the same.

2. Description of the Related Art

Display apparatuses such as televisions (TVs), monitors and the like may display broadcasting signals or image data of various formats using a display panel provided to display an image thereon. Examples of such a display panel include a liquid crystal display (LCD) panel, a plasma display panel (PDP) and other display panels known in the art which have been employed for various kinds of display apparatuses. In the case where a display apparatus employs a display panel such as the LCD panel which cannot generate light by itself, the apparatus is equipped with a backlight unit used to provide light to the panel.

Such a backlight unit of the display apparatus homogenizes light emitted from a light source implemented by a cold cathode fluorescent lamp or a light emitting diode device through a light guide plate and outputs the homogenized light to the display panel. Depending on an arrangement position of a light source relative to a light guide plate, the backlight unit may be divided into a direct type in which the light source is disposed in parallel to the back of the light guide plate and an edge type in which the light source is disposed at a lateral side of the light guide plate.

However, for such a related art display apparatus, since a light transmission pattern has to be processed to secure light homogeneity in the light guide plate, a design of the light guide plate is complicated and it is difficult to achieve lightness of the apparatus due to weight of the light guide plate. In addition, since structures for supporting various components of the display panel and the backlight unit are individually provided, there may arise a problem related to misalignment due to a tolerance in assembly and heat dissipation.

SUMMARY OF THE EXEMPLARY EMBODIMENTS

Accordingly, it is an aspect of the present exemplary embodiments to provide to a backlight unit with an improved support structure, and a display apparatus having the same.

Additional aspects of the exemplary embodiments will be set forth in part in the description which follows and, in part, will be obvious from the description, or may be learned by practice of the exemplary embodiments.

The foregoing and/or other aspects of the exemplary embodiments can be achieved by providing a display apparatus including: an image receiving unit which receives an image signal; an image processing unit which processes the image signal received in the image receiving unit; a display panel which displays the image signal processed by the image processing unit as an image; a cover unit which accommodates the display panel; a light source unit which is accommodated in an edge region of the cover unit and generates and emits light; a reflective member which is accommodated in the cover unit in such a manner that the reflective member is disposed in the rear side of the display panel and which reflects the light emitted from the light source unit toward the display panel; and an integrally formed support member including a support member body which is disposed in the edge region, a light source unit support unit which is formed in the support member body and supports the light source unit, and a panel support unit which is formed in the support member body and supports the display panel.

The light source unit may include a light source module including a plurality of light sources, and a lens which condenses light emitted from the light sources and directs the condensed light to the reflective member, and the light source unit support unit may include a module support part which supports the light source module; and a lens support part which supports the lens to be located on an optical path originating from the light sources.

The support member may further include a light source unit accommodating unit which is formed in one side of the support member body directed to the reflective member and extends along an edge of the display panel for accommodating the light source unit, and the light source unit support unit may be formed in the light source unit accommodating unit.

The support member may include a plurality of support member bodies corresponding to four directional edge regions of the display panel, and the module support part and the lens support part may be provided in one of two pairs of support member bodies facing each other.

The reflective member may be formed to be closer to the display panel as the reflective member approaches from a pair of light source modules facing each other to the central region of the display panel.

The cover unit may include a top cover and a bottom cover which cover the display panel from top and bottom sides, and a plate of the bottom cover supporting the reflective member may be formed to conform to a shape of the reflective member.

The light sources may include light-emitting diode devices.

The panel support unit may be formed to project from the support member body such that the edge regions of the display panel are securely mounted on the panel support unit.

The display apparatus may further include optical sheets which are supported to the panel support unit, control characteristics of the light reflected by the reflective member, and transmit the controlled light to the display panel.

The cover unit may include a top cover and a bottom cover which cover the display panel from top and bottom side, and the support member may include a plurality of support member bodies which are formed to be integrated with the top cover and are provided to be separated and assembled corresponding to the edges of the display panel.

The support member may be made of metal material.

The foregoing and/or other aspects of the exemplary embodiments can be achieved by providing a backlight unit for providing light to a display panel, including: a light source unit which is accommodated in an edge region of a display apparatus and generates and emits light; a reflective member which is disposed in the rear side of the display panel and reflects the light emitted from the light source unit toward the display panel; and an integrally formed support member including a support member body which is disposed in the edge region, a light source unit support unit which is formed in the support member body and supports the light source unit, and a panel support unit which is formed in the support member body and supports the display panel.

The light source unit includes a light source module including a plurality of light sources; and a lens which condenses light emitted from the light sources and directs the condensed light to the reflective member, and the light source unit support unit includes a module support part which supports the light source module; and a lens support part which supports the lens to be located on an optical path originated from the light sources.

The support member may further include a light source unit accommodating unit which is formed in one side of the support member body directed to the reflective member and extends along an edge of the display panel for accommodating the light source unit, and the light source unit support unit may be formed in the light source unit accommodating unit.

The support member may include a plurality of support member bodies corresponding to four directional edge regions of the display panel, and the module support part and the lens support part may be provided in one of two pairs of support member bodies facing each other.

The reflective member may be formed to be closer to the display panel as the reflective member approaches from a pair of light source modules facing each other to the central region of the display panel.

The light sources may include light-emitting diode devices.

The panel support unit may be formed to project from the support member body such that the edge regions of the display panel are securely mounted on the panel support unit.

The backlight unit may further include optical sheets which are supported to the panel support unit, control characteristics of the light reflected by the reflective member, and transmit the controlled light to the display panel. The support member may be made of metal material.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to the exemplary embodiments, examples of which are illustrated in the accompanying drawings, so that those skilled in the art can easily practice the exemplary embodiments. The exemplary embodiments are not limited to the exemplary embodiment disclosed herein but may be implemented in different forms. In the following embodiment, explanation of components having no direct relation to the spirit of the exemplary embodiments is omitted. However, it is appreciated that it is not meant to exclude such omitted components from the image forming apparatus 1 to which the spirit of the exemplary embodiments are applied.

Figure 1:
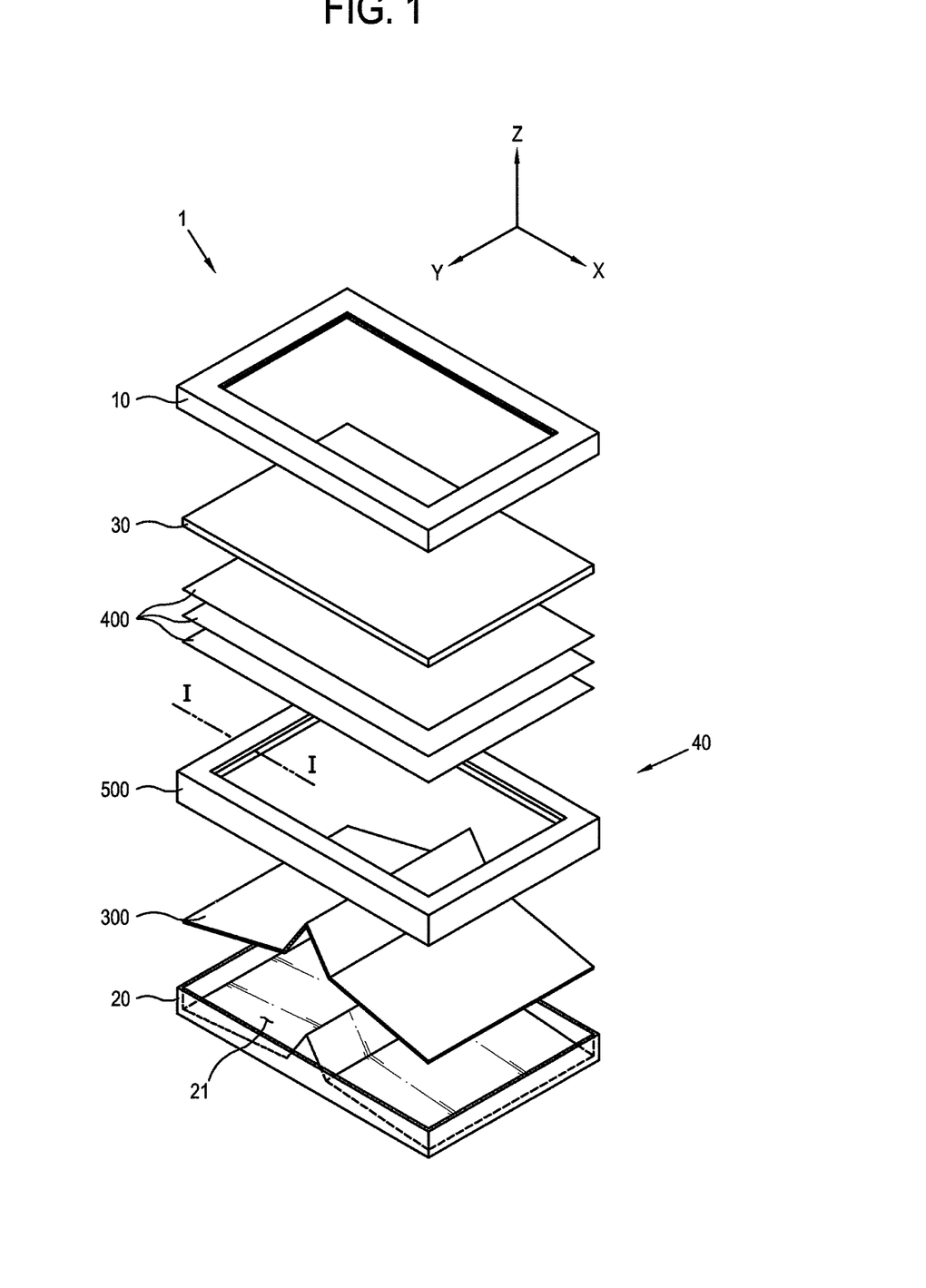
FIG. 1 is an exploded perspective view of a display apparatus according to a first exemplary embodiment.
Figure 2:
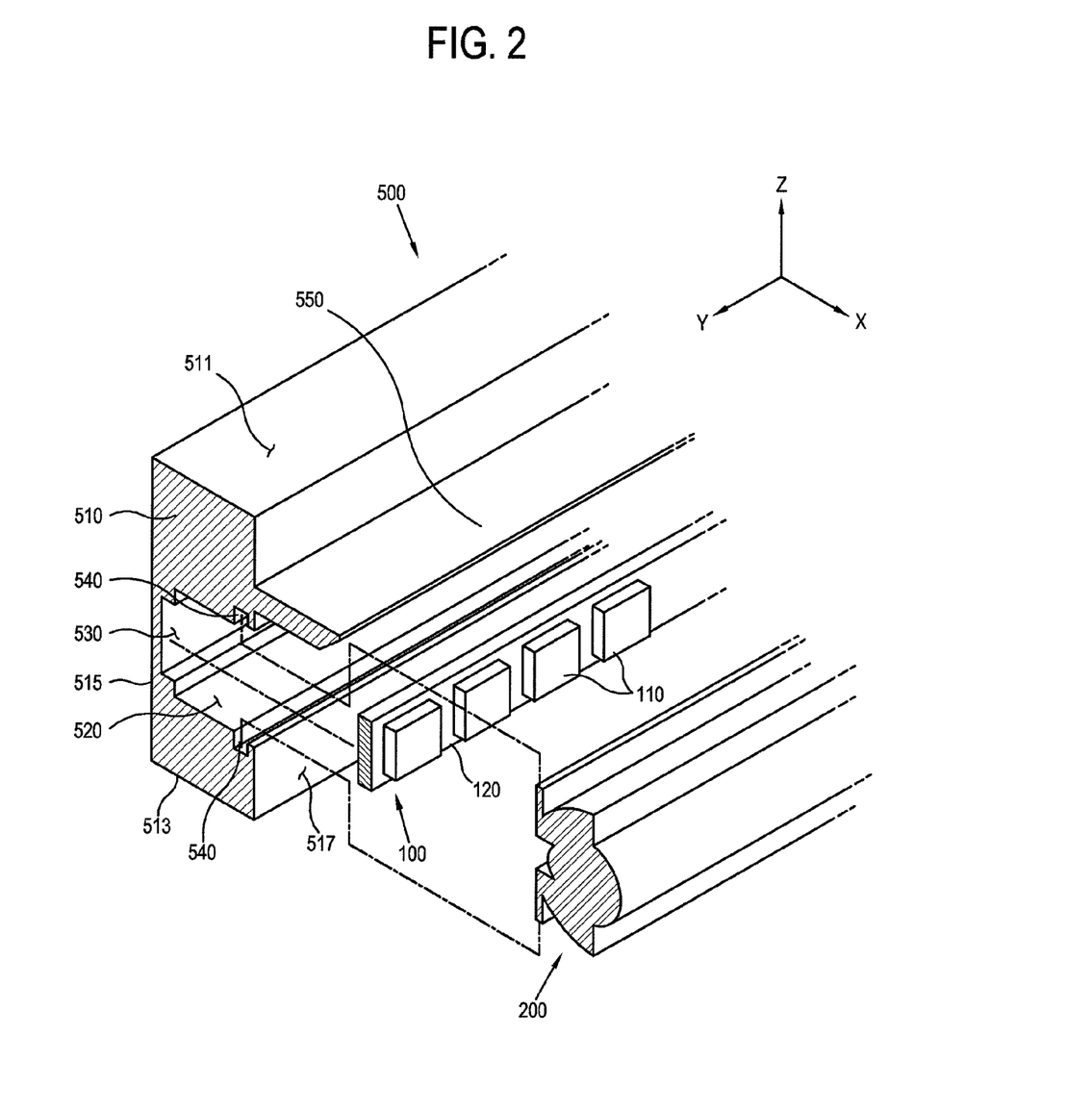
FIG. 2 is a main part perspective view showing an enlarged appearance taken along line I-I in the display apparatus of FIG. 1.

FIG. 1 is an exploded perspective view of a display apparatus 1 according to a first exemplary embodiment and FIG. 2 is a main part perspective view showing an enlarged appearance taken along line I-I in the display apparatus of FIG. 1.

First, several directions shown in the figures are defined. X, Y and Z directions represent width, length and height, respectively. A display panel 30 is placed on an X-Y plane and a backlight unit 40 and the display panel 30 are stacked along the Z direction. The following exemplary embodiments will be described based on the above definition of the directions definition. Here, directions reverse to the X, Y and Z directions are denoted by -X, -Y and -Z directions, respectively, and the X-Y plane refers to a plane formed by an X direction axis and a Y direction axis.

As shown in FIGS. 1 and 2, in the first exemplary embodiment, the display apparatus 1 includes a cover unit 10 and a cover unit 20 which defines an accommodating space, a display panel 30 which is accommodated in the accommodating space defined by the cover units 10 and 20 and on which an image is displayed, and a backlight unit 40 which is accommodated in the accommodating space and provides light to the display panel 30 so that the image can be displayed on the display panel 30.

The cover units 10 and 20 form an external appearance of the display apparatus 1 and accommodate the display panel 30 and the backlight unit 40. The cover units 10 and 20 include a top cover 10 and a bottom cover 20 which cover the top of the display panel 30 and the bottom of the backlight unit 40, respectively.

The top cover 10 is parallel to the X-Y plane and has an opening which is formed in a plate facing the display panel 30 such that a display region of the display panel 30 on which the image is displayed is externally exposed.

The bottom cover 20 is parallel to the X-Y plane and supports a reflective member 300 and a support member 500, both of which will be described later, on a plate directed to the Z direction. Here, the bottom cover 20 has a reflective member support 21 which is formed to conform to the shape of the reflective member 300 on the plate. More specifically, the reflective member support 21 supports the reflective member 300 stably as it is formed to fit a tilt angle and a bent shape of the reflective member 300.

Each of the top cover 10 and the bottom cover 20 has sidewalls arranged at four directional edges in the X, -X, Y and -Y directions with respect to the display panel 30. When the display apparatus 1 is assembled, the display panel 30 and the backlight unit 40 are supported by these sidewalls such that the display panel 30 and the backlight unit 40 are not moved in a direction parallel to the X-Y plane.

In this exemplary embodiment, the display panel 30 may be implemented by a liquid crystal display panel. The display panel 30 includes two opposite substrates (not shown) with a liquid crystal layer (not shown) interposed therebetween and displays an image by applying a driving signal to the liquid crystal layer to control alignment of liquid crystal molecules contained in the liquid crystal layer. The display panel 30 cannot emit light by itself and thus has to receive light from the backlight unit 40 in order to display an image on the display region. Here, the display region refers to a region in the display panel 30 which is parallel to the X-Y plane and on which the image is displayed.

The display panel 30 further includes a driving circuit board (not shown) which generates the driving signal. When the driving signal is applied from the driving circuit board to the display panel 30, the liquid crystal molecules contained in the liquid crystal layer (not shown) are rotated by a certain angle. Accordingly, light transmission characteristics become different for different cells (not shown) constituting the display region of the display panel 30, thereby allowing the image to be displayed on the display region.

The backlight unit 40 includes a light source units 100 and 200 (FIG. 2) which are arranged at an edge region of the display apparatus 1 and generates and emits light, the reflective member 300 which is disposed along the back of the display panel 30 and reflects the light emitted from the light source units 100 and 200 toward the display region of the display panel 30, optical sheets 400 which control characteristics of the light reflected by the reflective member 300 and delivers the controlled light to the display panel 30, and the support member 500 which is disposed in the edge region of the display apparatus 1 and supports the light source unit 100 and 200 and the display panel 30.

The light source units 100 and 200 include a light source module 100 (FIG. 2) which generates light and a lens 200 which condenses the light emitted from the light source module 100 and emits the condensed light to the reflective member 300. Although the light source units 100 and 200 are shown to be placed in X directional and -X directional edge regions of four directional edge regions in this exemplary embodiment, the spirit of the exemplary embodiments is not limited thereto. Alternatively, the light source units 100 and 200 may be placed either in Y directional and -Y directional edge regions or in one of the four directional edge regions. In this exemplary embodiment, the shape of the reflective member 300 may be differently designed depending on how the light source units 100 and 200 are placed.

In the following exemplary embodiment, the light source units 100 and 200 placed in only the -X directional edge region will be described, which can be equally applied to the light source units 100 and 200 placed in the X directional edge region, explanation of which will not be repeated.

The light source module 100 includes a plurality of light sources 110 disposed in series along the Y direction and a module substrate 120 on which the plurality of light sources 110 is mounted.

In this exemplary embodiment, the light sources 110 may be implemented by light-emitting diodes (LEDs) and are supplied with driving power and a lighting control signal from the module substrate 120. The light sources 110 may control an emission direction depending on how they are mounted on the module substrate 120. In this exemplary embodiment, the light sources 110 and the module substrate 120 are disposed such that the irradiation direction of the light is in the X direction.

Each of the light sources 110 mounted on one module substrate 120 may include a red LED, a green LED and a blue LED. Red light, green light and blue light emitted from the respective color LEDs are together mixed to form white light with excellent color reproducibility. However, this is only one example, since the light sources 110 may each include a white LED which directly generates white light.

The lens 200 is disposed adjacent to the light sources 110 on an optical path which originates from the light source 110 and extends in the Y direction in line with the plurality of light sources 110. The lens 200 condenses the light from the light sources 110 and directs the condensed light to the central region of the display apparatus 1 in the X direction. The lens 200 may be modified in various ways depending on optical characteristics required by the display apparatus 1 and may be made of material such as plastic for example, poly-methylmethacrylate), resin or the like.

The reflective member 300 has a reflective surface facing the display region of the display panel 30. This reflective surface is formed to be closer to the display panel 30 as it becomes further apart from the light source module 100. This allows the light emitted from the light source units 100 and 200 in the X direction parallel to the plate of the display panel 30 to be well reflected toward the display panel 300.

When light source modules 100 and 200 are disposed face to face in pair as in this exemplary embodiment, since the reflective surface of the reflective member 300 moves closer to the display panel 30 as it moves further apart from the light source modules 100, the reflective member 300 is symmetrical with respect to the central region of the display panel 30.

In the rear side of the display panel 30 is stacked at least one of the optical sheets 400 in parallel to the display panel 30. The optical sheets 400 may include a prism sheet, a diffusion sheet, a protection film and the like, but is not limited thereto, and control characteristics of the light reflected from the reflective member 300 and transmit the controlled light to the display panel 30.

The support member 500 may be formed in a rectangular loop shape along the four direction edge regions of the display apparatus 1 or the display panel 30. The support member 500 is interposed between the top cover 10 and the bottom cover 20 to support them.

FIG. 2 is a main part perspective view showing the support member 500 in more detail.

As shown in FIG. 2, the support member 500 includes a support member body 510, light source unit support units 530 and 540 which are formed in the support member body 510 and support the light source units 100 and 200, and a panel support unit 550 which is formed in the support member body 510 and supports the display panel 30.

In this manner, the support member 500 is formed such that components supporting the light source units 100 and 200 and the display panel 30 are integrated. Such an integrated configuration of the support member 500 can bring improvement of radiation efficiency of heat generated in the light source units 100 and 200, improvement in assembly, prevention of misalignment which may occur due to assembly tolerance between components, etc.

The support member 500 may be manufactured in an integral form by a process such as an extrusion molding and is made of metal material, for example, an aluminum alloy for manufacturability, assembleability and heat radiation.

The support member body 510 includes a top surface 511 contacting the top cover 10, a bottom surface 513 contacting the bottom cover 20, an outer surface 515 directed to the outer side of the display apparatus 1, and an inner surface 517 directed to the inner side of the display apparatus 1, i.e., the light emission direction of the light source units 100 and 200 on the basis of its rectangular section.

The support member body 510 includes a light source unit accommodating unit 520 which is indented from the inner surface 517 along a length direction, i.e., an extension direction of the light source module 100. The light source unit accommodating unit 520 accommodates the light source units 100 and 200, i.e., the light source module 100 and the lens 200, and is not formed in the support member body in which the light source units 100 and 200 are not placed.

The light source support units 530 and 540 include a module support part 530 which is formed in the inner side of the light source unit accommodating unit 520 and supports the light source module 100, and a lens support part 540 which is formed in an entrance region of the light source unit accommodating unit 520 such that the lens 200 is located on the optical path originating from the light source 110.

A configuration where the module support part 530 and the lens support part 540 support the light source module 100 and the lens 200 respectively is not particularly limited thereto but may be modified in various manners.

For example, the module support part 530 may be implemented by a groove extending along the light source module 100 in the light source unit accommodating unit 520 and may be configured such that the module substrate 120 is supported as the module substrate 12 is inserted in the module support part 530 implemented by the groove. Alternatively, the module support part 530 may include a hook to which the module substrate 102 is locked by virtue of elastic deformation of the module substrate 120. In addition, the lens support part 540 may be implemented by grooves which are formed in the top and bottom of the light source member accommodating unit 520 and in which both top and bottom ends of the lens 200 are respectively inserted.

The panel support unit 550 projects from the inner surface 517 between the top surface 511 and the light source unit accommodating unit 520 to the central region of the display apparatus 1. The panel support unit 550 is securely mounted with edge regions of the display panel 30 and the optical sheets 400 and supports the display panel 30 and the optical sheets 400 along with the top cover 10.

The length by which the panel support unit 550 projects from the support member body 510 may be specified in various ways within a range in which the panel support unit 550 can support the display panel and the optical sheets 400 but is limited to a range in which the panel support unit 550 does not interfere with the light reflected by the reflective member 300.

Figure 3:
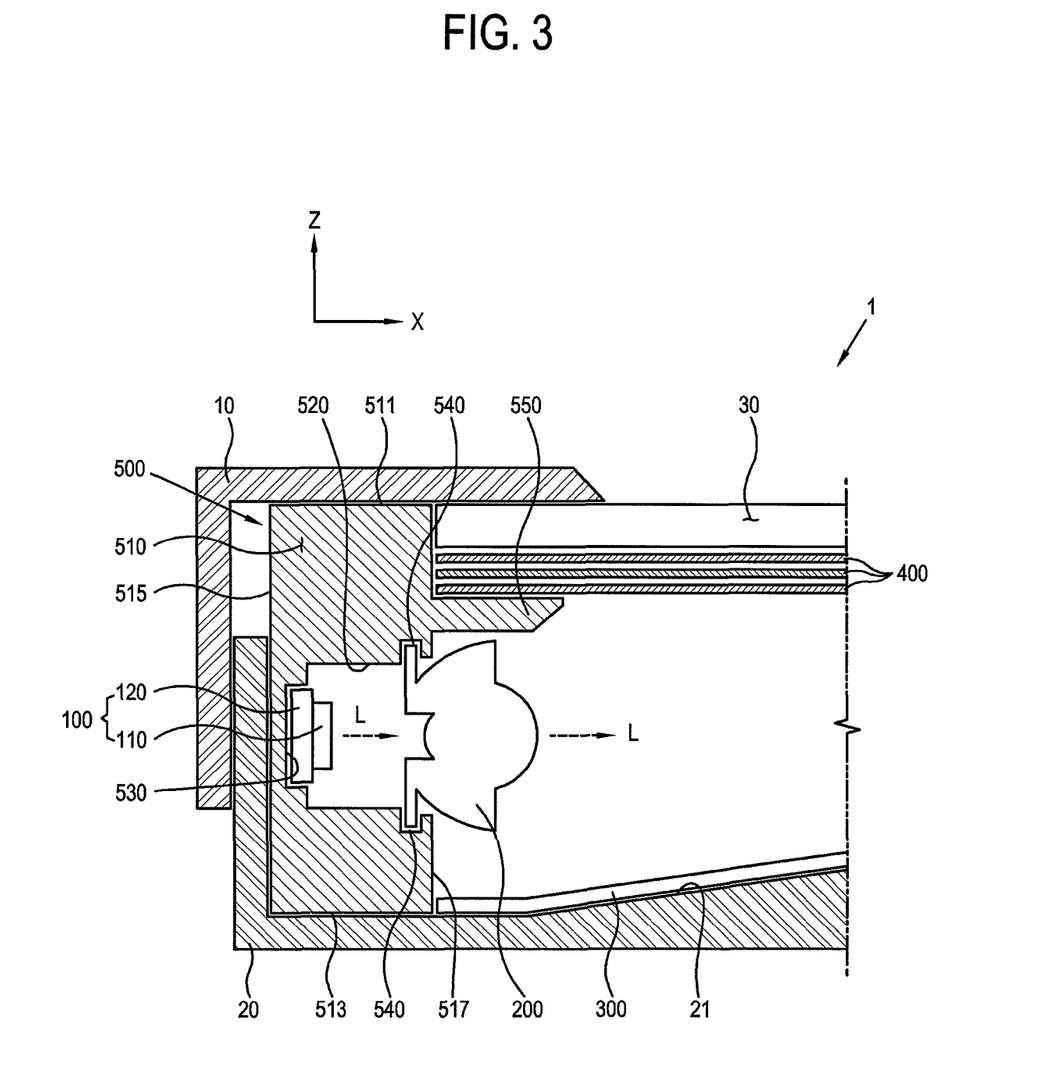
FIG. 3 is a main part side sectional view showing coupling between components of the display apparatus of FIG. 1.

FIG. 3 is a main part side sectional view showing coupling between components of the display apparatus 1.

As shown in FIG. 3, the display panel 30 and the backlight unit 40 are accommodated in the accommodating space defined by the top cover 10 and the bottom cover 20. In an edge region of the accommodating space is disposed the support member 500 which supports the top cover 10 and the bottom cover 20, which results in increase of strength of an edge region of the display apparatus 1.

The light source unit accommodating unit 520 of the support member 500 accommodates the light source module 100 and the lens 200 and the module support part 530 and the lens support part 540 accommodate the light source module 100 and the lens 200, respectively. In addition, the panel support unit 550 supports the display panel 30 and the optical sheets 400 along with the top cover 10.

In this manner, the module support part 530, the lens support part 540 and the panel support unit 550 are implemented as the integrally formed support member 500. This can prevent assembly tolerance and misalignment as compared to an implementation where the module support part 530, the lens support part 540 and the panel support unit 550 are separately configured.

The reflective member 300 is supported by the reflective member support 21 of the bottom cover 20.

The light L emitted from the light source 110 in the X direction is condensed while passing through the lens and is emitted to the reflective member 300. Here, the light L from the light source 110 can also be reflected to the lens 200 by the reflective surface formed in the light source unit accommodating unit 520.

The light L passing through the lens 200 is reflected by the reflective member 300 in the Z direction and is incident into the optical sheets 400. The light L passing through the optical sheets 400 has its adjusted characteristic and is incident into the display panel 30 on which an image is accordingly displayed.

In addition to the light L, the light source 110 generates heat which is transferred to the top cover 10 and the bottom cover 20 via the support member 500 for heat radiation. Since the support member 500 is integrally made of metal material, the heat of the light source 110 can be efficiently transferred to the top cover 10 and the bottom cover 20.

An order of assembling the display apparatus 1 is as follows, although not limited thereto by manufacturers. First, the light source module 100 is mounted on the module support part 530 in the light source unit accommodating unit 520 and then the lens 200 is mounted on the lens support part 540. The display panel 30 and the optical sheets 400 are stacked and securely mounted on the panel support unit 550.

The reflective member 300 is mounted on the bottom cover 20. Then, the support member 550 supporting the light source module 100, the lens 200, the optical sheets 400 and the display panel 30 is accommodated in the bottom cover 20. The display panel 30 is covered by the top cover 10 from the top side. In this manner, the assembly of the display apparatus can be carried out.

As described above, this exemplary embodiment employs the integrally formed support member 500 supporting the light source units 100 and 200, the optical sheets 400 and the display panel 30 within the cover units 10 and 20. This can bring an increase in the mechanism strength of an edge region of the display apparatus 1, improvement in assembly and productivity, increase of heat radiation efficiency, etc.

Figure 4:
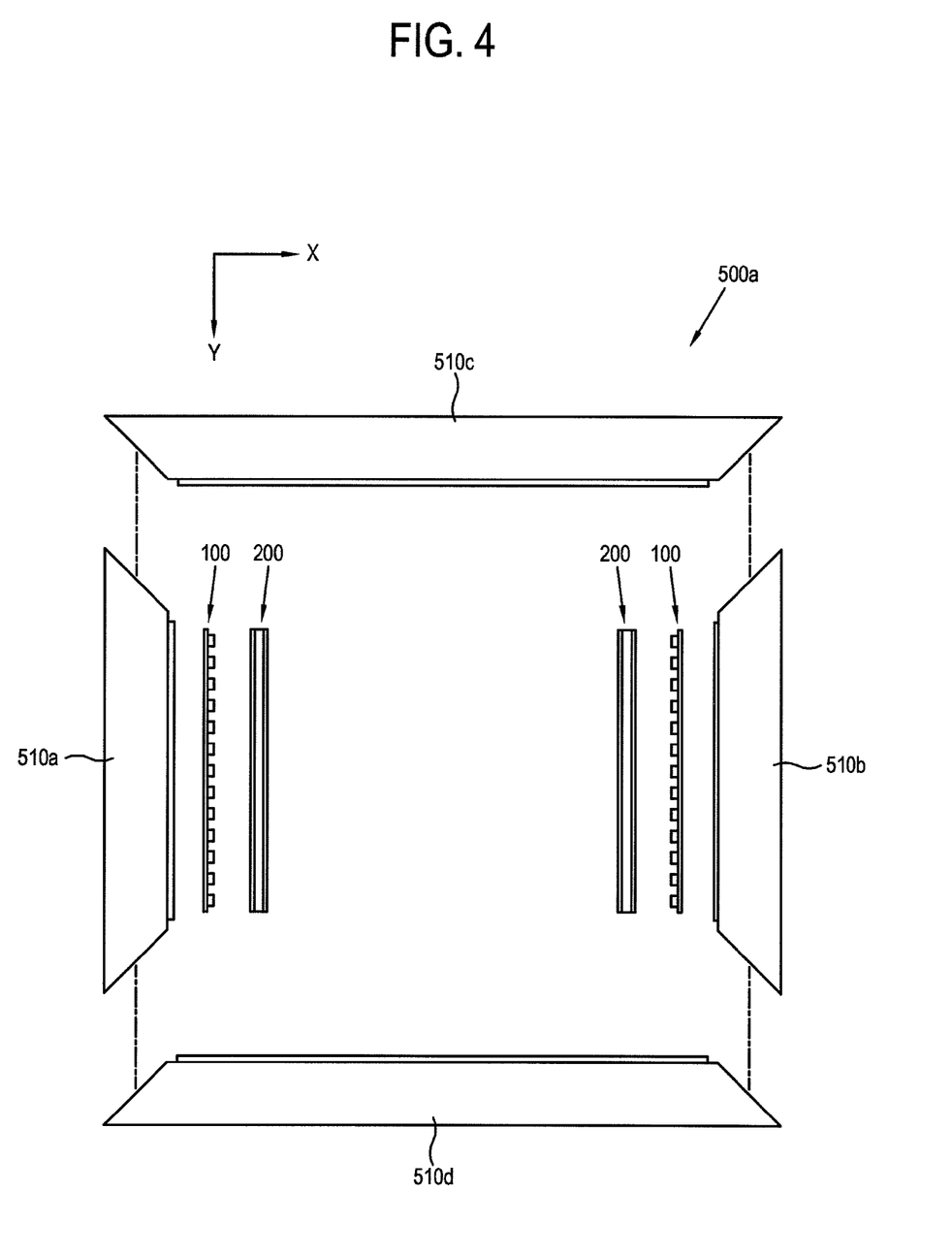
FIG. 4 is a plan view showing a configuration of a support member according to a second exemplary embodiment.

Although it has been illustrated in the first exemplary embodiment that the support member 500 has one loop-like support member body 510, the spirit of the exemplary embodiments is not limited thereto. Hereinafter, a second exemplary embodiment having a support member 500a different from that in the first exemplary embodiment will be described with reference to FIG. 4. FIG. 4 is a plan view showing a configuration of a support member 500a according to the second exemplary embodiment.

The support member 500a includes a plurality of support member bodies 510a, 510b, 510c and 510d corresponding to the four directional edge regions of the display panel 300, respectively. More specifically, the support member 500a is divided into a first support member body 510a, a second support member body 510b, a third support member body 510c and a fourth support member body 510d, which are arranged in the -X, X, -Y and Y directional edges of the display panel 30. The support member bodies 510a, 510b, 510c and 510d are arranged in the corresponding edges of the display panel 30 in assembly of the display apparatus 1.

The first support member body 510a and the second support member body 510b face each other and the third support member body 510c and the fourth support member body 510d also face each other. In this exemplary embodiment, the light source module 100 and the lens are placed in the first support member body 510a and the second support member body 510b, respectively. Here, the light source module 100 and the lens 200 are disposed in such a manner that their light directions are opposite to each other.

In this case, the light source unit accommodating unit 520 and the light source unit support units 530 and 540 are formed in the first support member body 510a and the second support member body 510b, respectively, and the panel support unit 550 is formed in all the support member bodies 510a, 510b, 510c and 510d.

In this manner, when the support member 500a is divided into the plurality of support member bodies 510a, 510b, 510c and 510d, the support member bodies 510a, 510b, 510c and 510d extend linearly, thereby facilitating manufacture of the support member 500a, which results in improved productivity. In particular, if the support member 500a is manufactured by extrusion molding, it is beneficial to separate the support member bodies 510a, 510b, 510c and 510d.

Although it has been illustrated in the first exemplary embodiment that the support member 500 is separated from the top cover 10, the support member 500 and the top cover 10 may be integrally configured. Hereinafter, a third exemplary embodiment showing such a configuration will be described with reference to FIG. 5.

Figure 5:
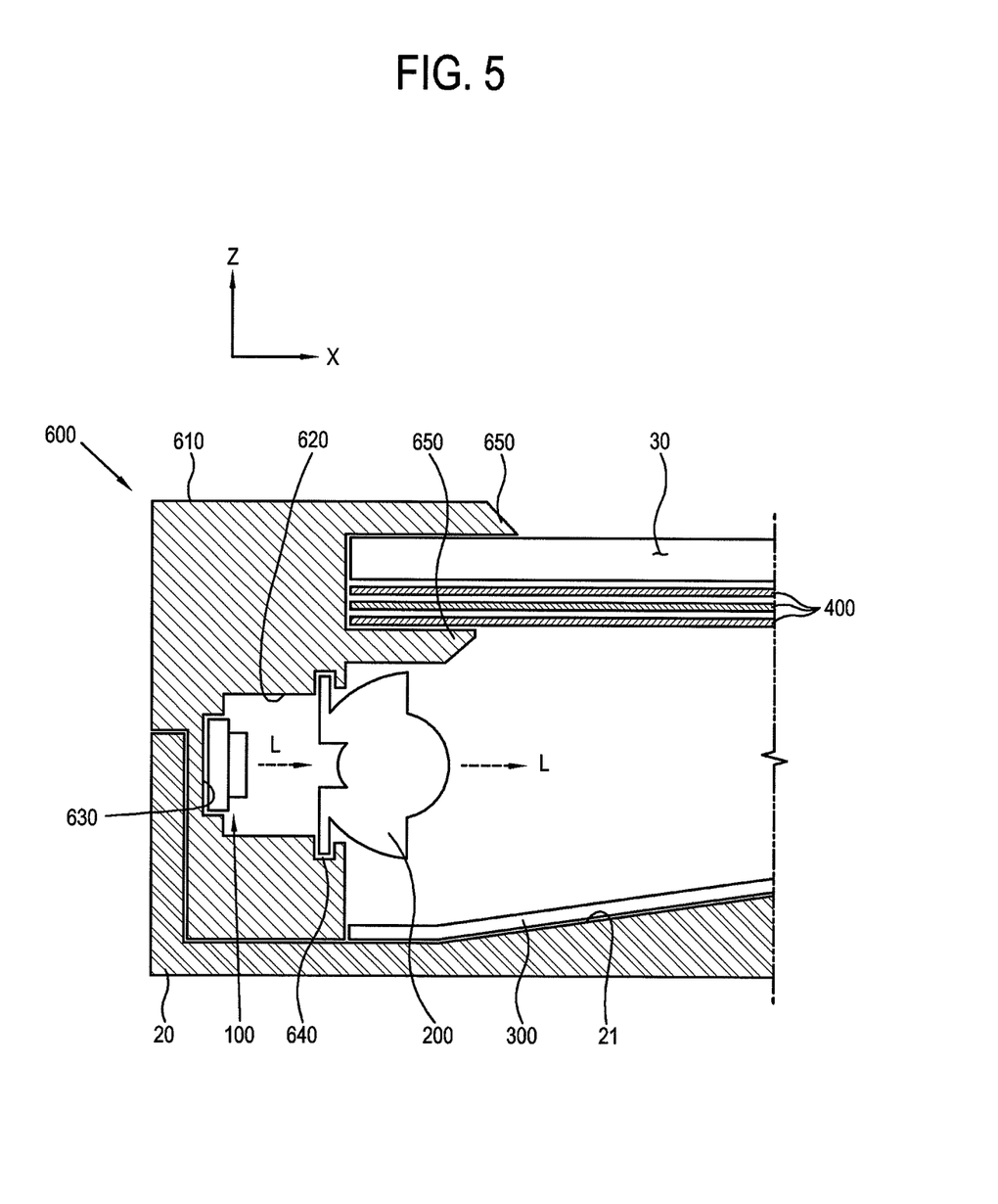
FIG. 5 is a main part side sectional view showing coupling between components of a display apparatus according to a third exemplary embodiment.

FIG. 5 is a main part side sectional view showing coupling between components of a display apparatus 1 according to the third exemplary embodiment. In the third exemplary embodiment, the description about the first exemplary embodiment may be equally applied to the same structure and function as the third exemplary embodiment, and therefore, explanation of which will not be repeated.

As shown in FIG. 5, a support member 600 includes a support member body 610, a light source unit accommodating unit 620 which is formed in the support member body 610 and accommodates the light source units 100 and 200, a light source unit support unit 630 and 640 which is formed in the light source unit accommodating unit 620 and supports the light source units 100 and 200, and a panel support unit 650 which supports the display panel 30 and the optical sheets 400.

In this exemplary embodiment, the panel support unit 650 supports the top and bottom of the display panel 30 and the optical sheets 400. This is replaced for the configuration where the top cover 10 supports the top of the display panel 30 in the first exemplary embodiment, and the panel support unit 650 has a groove extending along the length direction of the support member body 610, in which edge regions of the display panel 30 and the optical sheets 400 are accommodated.

However, when the display apparatus 1 of the third exemplary embodiment is assembled, if the support member 500 has the loop shape like the first exemplary embodiment, it is difficult for the display panel 30 and the optical sheets 400 to be supported to the panel support unit 650.

Accordingly, in this case, the support member 600 is divided into a plurality of support member bodies 610 corresponding to respective edges of the display panel 30 like the second exemplary embodiment. In assembling the display apparatus 1, the panel support units 650 formed in the respective support member bodies 610 are inserted in edges of the display panel 30 and the optical sheets 400.

The above-described exemplary embodiments can be applied to display apparatuses 1 implemented in different forms. Hereinafter, a fourth exemplary embodiment where the display apparatus 1 is implemented by a TV to which the above-described first to third exemplary embodiments are applied will be described with reference to FIG. 6.

Figure 6:
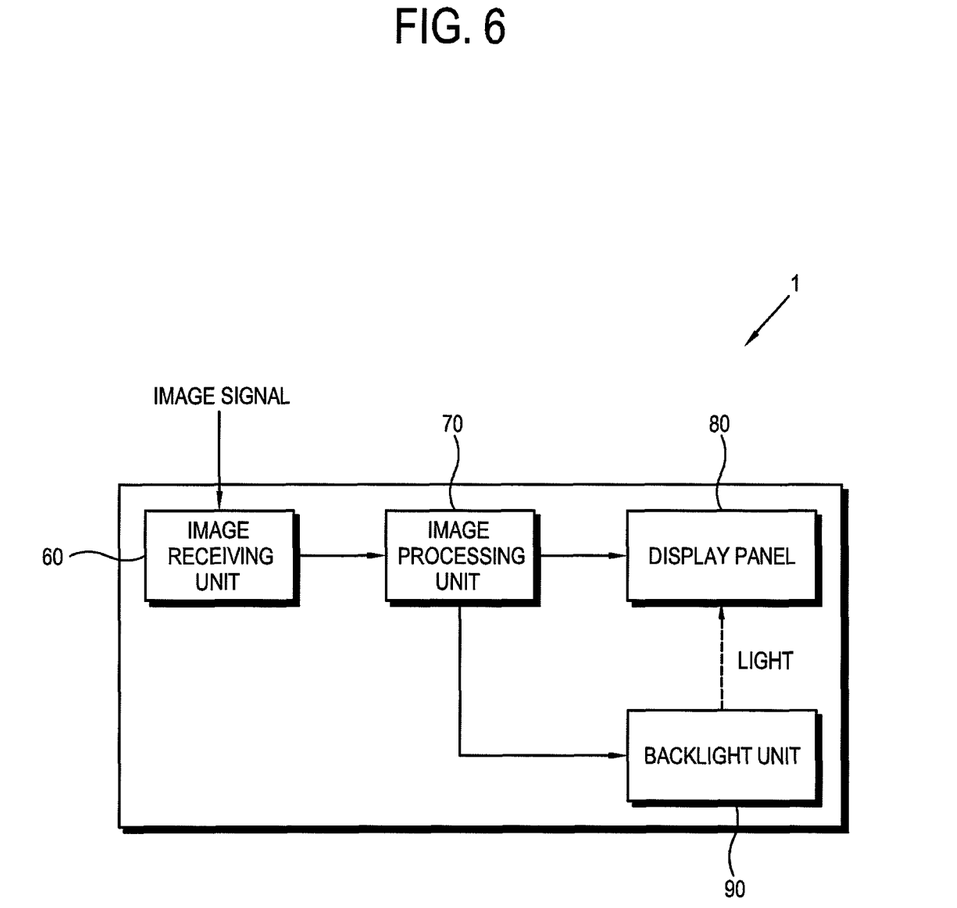
FIG. 6 is a configuration block diagram of a display apparatus according to a fourth exemplary embodiment.

FIG. 6 is a configuration block diagram of a display apparatus according to the fourth exemplary embodiment. In FIG. 6, solid lines represent transmission of an image signal or a control signal and a dotted line represents light transmission.

As shown in FIG. 6, in this exemplary embodiment, the display apparatus 1 includes an image receiving unit 60 which receives an image signal, an image processing unit 70 which processes the image signal received in the image receiving unit 60, a display panel 80 which display the image signal processed by the image processing unit 70 as an image, and a backlight unit 90 which provides light for the display panel 80 so that the image can be displayed on the display panel 80.

The image receiving unit 60 may have various standards as follows. For example, if the display apparatus 1 is implemented by a TV, the image receiving unit 60 may receive a radio frequency (RF) signal from a broadcasting station (not shown) by wireless means or receive a composite video, a component video, a super video or an image signal according to a SCART standard or a high definition multimedia interface (HDMI) standard. If the display apparatus 1 is a computer monitor, the image receiving unit 60 may be implemented to receive an image signal according to a D-SUB standard which can transmit an RGB signal based on a VGA scheme, a digital video interactive (DVI) standard or a HDMI standard.

The image processing unit 70 performs various preset image processes for the image signal transmitted from the image receiving unit 60. The kind of image processes performed by the image processing unit 70 is not particularly limited. For example, the image processes include decoding, encoding, de-interlacing, frame refresh rate conversion, scaling, noise reduction for improvement of image quality, detail enhancement and the like corresponding to various image formats.

The image processing unit 70 may be implemented as a separate component which can independently perform these processes or may be implemented as an integral component which integrates various functions.

The display panel 80 and the backlight unit 90 have substantially the same configuration as those in the above previously described embodiments, and therefore, explanation of which will not be repeated.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A display apparatus comprising:
an image receiving unit which receives an image signal;
an image processing unit which processes the image signal received in the image receiving unit;
a display panel which displays the image signal processed by the image processing unit as an image;
a cover unit which accommodates the display panel;
a light source unit which is accommodated in an edge region of the cover unit and generates and emits light;
a reflective member which is accommodated in the cover unit such that the reflective member is disposed in a rear side of the display panel and which reflects the light emitted from the light source unit toward the display panel; and
an integrally formed support member comprising a support member body which is disposed in the edge region, a light source unit support unit which is formed in the support member body and supports the light source unit, and a panel support unit which is formed in the support member body and supports the display panel;
wherein the light source unit comprises:
a light source module comprising a plurality of light sources; and a lens which condenses light emitted from the light sources and directs the condensed light to the reflective member, wherein the light source unit support unit comprises:

a module support part which supports the light source module; and a lens support part which supports the lens to be located on an optical path which originates from the light sources; and wherein the light condensed by the lens is directly transmitted from the lens to the reflective member through an air.

2. The display apparatus according to claim 1, wherein the support member further comprises a light source unit accommodating unit which is formed in one side of the support member body and directed to the reflective member and extends along an edge of the display panel for accommodating the light source unit, and wherein the light source unit support unit is formed in the light source unit accommodating unit.

3. The display apparatus according to claim 1, wherein the support member comprises a plurality of support member bodies which correspond to four directional edge regions of the display panel, and wherein the module support part and the lens support part are provided in one of two pairs of support member bodies facing each other.

4. The display apparatus according to claim 3, wherein the reflective member is formed to be closer to the display panel as the reflective member moves from a pair of light source modules facing each other to a central region of the display panel.

5. The display apparatus according to claim 4, wherein the cover unit comprises a top cover and a bottom cover which cover the display panel from top and bottom sides, and wherein a plate of the bottom cover supporting the reflective member is formed to conform to a shape of the reflective member.

6. The display apparatus according to claim 1, wherein the plurality of light sources comprise light-emitting diode devices.

7. The display apparatus according to claim 1, wherein the panel support unit projects from the support member body such that edge regions of the display panel are securely mounted on the panel support unit.

8. The display apparatus according to claim 7, further comprising optical sheets which are mounted on the panel support unit, and the optical sheets control characteristics of the light reflected by the reflective member and transmit the controlled light to the display panel.

9. The display apparatus according to claim 1, wherein the cover unit comprises a top cover and a bottom cover which cover the display panel from a top side and a bottom side, and wherein the support member comprises a plurality of support member bodies which are formed to be integrated with the top cover and are provided to be separated and assembled corresponding to edges of the display panel.

10. The display apparatus according to claim 1, wherein the support member is made of a metal material.

11. A backlight unit for providing light to a display panel, the back light unit comprising:

a light source unit which is accommodated in an edge region of a display apparatus and generates and emits light to the display panel;

a reflective member which is disposed in a rear side of the display panel and reflects the light emitted from the light source unit toward the display panel; and an integrally formed support member comprising a support member body which is disposed in the edge region, a light source unit support unit which is formed in the support member body and supports the light source unit, and a panel support unit which is formed in the support member body and supports the display panel;

wherein the light source unit comprises:

a light source module comprising a plurality of light sources; and a lens which condenses light emitted from the light sources and directs the condensed light to the reflective member, wherein the light source unit support unit comprises:

a module support part which supports the light source module; and a lens support part which supports the lens to be located on an optical path which originates from the light sources; and wherein the light condensed by the lens is directly transmitted from the lens to the reflective member through an air.

12. The backlight unit according to claim 11, wherein the support member further comprises a light source unit accommodating unit which is formed in one side of the support member body directed to the reflective member and extends along an edge of the display panel to accommodate the light source unit, and wherein the light source unit support unit is formed in the light source unit accommodating unit.

13. The backlight unit according to claim 11, wherein the support member comprises a plurality of support member bodies which correspond to four directional edge regions of the display panel, and wherein the module support part and the lens support part are provided in one of two pairs of support member bodies facing each other.

14. The backlight unit according to claim 13, wherein the reflective member is formed to be closer to the display panel as the reflective member moves from a pair of light source modules facing each other to a central region of the display panel.

15. The backlight unit according to claim 11, wherein the light sources comprise light-emitting diode devices.

16. The backlight unit according to claim 11, wherein the panel support unit projects from the support member body such that the edge regions of the display panel are securely mounted on the panel support unit.

17. The backlight unit according to claim 16, further comprising optical sheets which are mounted on the panel support unit, and the optical sheets control characteristics of the light reflected by the reflective member, and transmit the controlled light to the display panel.

18. The backlight unit according to claim 11, wherein the support member is made of a metal material.

* * * * *